(12) United States Patent
Adomeit (10) Patent No.: US 7,137,647 B2
(45) Date of Patent: Nov. 21, 2006

(54) GAS BAG FOR OCCUPANT PROTECTION DEVICE

(75) Inventor: Heinz-Dieter Adomeit, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 25 days.

(21) Appl. No.: 10/336,836

(22) Filed: Jan. 6, 2003

(65) Prior Publication Data

US 2004/0232681 A1    Nov. 25, 2004

Related U.S. Application Data

(63) Continuation of application No. PCT/DE01/02532, filed on Jul. 5, 2001.

(30) Foreign Application Priority Data

Jul. 5, 2000   (DE) ................................ 100 33 937

(51) Int. Cl.
  *B60R 21/16*   (2006.01)
  *B60R 21/24*   (2006.01)
(52) U.S. Cl. ............................... 280/743.2; 280/743.1; 280/732; 280/729
(58) Field of Classification Search ................ 280/729, 280/731, 743.2, 732, 730.2, 743.1; *B60R 21/24*
See application file for complete search history.

(56) References Cited

U.S. PATENT DOCUMENTS

| 3,588,142 | A |   | 6/1971 | Gorman |
| 4,828,286 | A | * | 5/1989 | Fohl ........................... 280/731 |
| 5,125,682 | A | * | 6/1992 | Hensler et al. .......... 280/730.1 |
| 5,190,313 | A | * | 3/1993 | Hickling ..................... 280/731 |
| 5,480,184 | A |   | 1/1996 | Young |
| 5,934,701 | A |   | 8/1999 | Furukawa |
| 6,042,147 | A |   | 3/2000 | Nishijima et al. |
| 6,059,311 | A |   | 5/2000 | Wipasuramonton et al. |

FOREIGN PATENT DOCUMENTS

| DE | 4334606 | 4/1994 |
| DE | 197 49 914 | 1/1999 |
| DE | 197-47-410 | 4/1999 |
| DE | 197-57-410 | 6/1999 |
| DE | 199 30 157 | 1/2001 |
| JP | 5-178146 A * | 7/1993 |
| JP | 7-285408 A * | 10/1995 |
| JP | 10 166981 | 6/1998 |
| WO | WO 97/34783 | 9/1997 |

\* cited by examiner

*Primary Examiner*—Ruth Ilan
(74) *Attorney, Agent, or Firm*—Foley & Lardner LLP (57) ABSTRACT

A gas bag for an occupant protection device in motor vehicles that includes a gas bag configured to be inflated by a gas generator. The gas bag has an envelope surface that is assigned to a vehicle occupant to be protected and an envelope that forms, in the inflated state, a gap leading into the envelope surface. The gap is defined along longitudinal sides by first and second sections of the gas bag that are opposite one another. The gas bag is configured so that a body part facing the gas bag of a vehicle occupant who is sitting outside a normal seating position can penetrate the gap as the gas bag inflates thereby expanding the gap. Additionally, the first and second sections of the gas bag are restrained relative to one another so that the first section and the second section close the gap after inflation of the airbag in order to prevent the penetration of a body part of a vehicle occupant into the gap after the complete inflation of the gas bag.

19 Claims, 8 Drawing Sheets

GAS BAG FOR OCCUPANT PROTECTION DEVICE

CROSS-REFERENCE TO RELATED APPLICATIONS

This is a continuation of International Application PCT/DE01/02532, which has an international filing date of Jul. 5, 2001; the International Application was not published in English, but was published in German as WO 02/02376.

BACKGROUND

The invention relates to a gas bag for an occupant protection device in motor vehicles. In particular, a gas bag that can be inflated by means of a gas generator and the outer envelope of which, in the inflated state, includes an envelope surface assigned to the occupant to be protected.

Such a gas bag can be inflated by means of a gas generator and, in the inflated state, forms a cushion which is filled with gas and offers an occupant protection from injuries in the event of a crash. To this end, the gas bag or an airbag module containing the gas bag is arranged in a motor vehicle in such a way that the outer envelope of the gas bag, in the inflated state of the gas bag, has an envelope surface which faces the occupant and which the occupant is intended to strike in the event of a crash.

However, there is the problem that the gas bag unfolding during the inflation may cause considerable injuries to a vehicle occupant if the latter is outside his normal seating position when the gas bag is inflated (the Out Of Position or "OOP" situation). Different proposals have therefore already been made in order to avoid injuries to vehicle occupants by the unfolding gas bag. According to one proposal, sensors are provided which detect an unusual seating position of an occupant and then if need be prevent the triggering of an airbag module and thus the inflation and unfolding of the corresponding gas bag. Another known solution approach consists in using a multistage gas generator for the inflation of the gas bag, the gas bag, with the first stage, first of all only being inflated to a comparatively low internal pressure in order to avoid the risk of injury to the occupant.

German Patent No. DE 197 49 914 A1, hereby incorporated by reference, discloses an arrangement for impact protection on a steering wheel of a motor vehicle, this arrangement having a gas bag with an associated filling device for inflating the gas bag, the entire filling volume of the gas bag being designed in a ring shape and the gas bag having a conical or funnel-shaped recess on its front surface facing the driver. This is intended to reduce the impact of the vehicle occupant in an OOP situation.

German Patent No. DE 197 57 410 A1, hereby incorporated by reference, discloses a gas bag for an airbag module, this gas bag having a gas bag section which has been cut free, is movable independently of the remaining gas bag region and lies inside the outer contour of the gas bag. This section can accompany the movement of the occupant in the event of a crash.

The problem underlying the invention is to improve a gas bag of the type mentioned at the beginning to the effect that the risk of injury to an occupant during the inflation of the gas bag in an OOP situation is minimized.

SUMMARY

An object of the present invention is to provide a gas bag for an occupant protection device in motor vehicles that minimizes the risk of injury to an occupant during the inflation of the gas bag in an OOP situation.

According to an embodiment of the present invention, a gas bag for an occupant protection device in motor vehicles is provided. The gas bag can be inflated, for example, by means of a gas generator and includes an outer envelope. In the inflated state, the outer envelope of the gas bag has an envelope surface assigned to the occupant to be protected. The outer envelope of the gas bag, in the inflated state, forms a gap that leads into the envelope surface assigned to the occupant. In an OOP situation, when the gas bag is inflating, a body part of the occupant facing the gas bag can penetrate into the forming gap, thus expanding the gap. Additionally, two sections of the gas bag that define the gap along opposite longitudinal sides are restrained relative to one another in such a way that they close the gap after inflation of the gas bag. This prevents penetration of a body part of the occupant into the gap after the complete inflation of the bag.

In this embodiment, provision is made for the outer envelope of the gas bag, in the inflated state, to form a gap which leads into the envelope surface of the gas bag assigned to the occupant, and for the occupant, in an OOP situation, when the gas bag is inflated, to be able to penetrate (with a body part facing the gas bag) into the forming gap and to expand the latter in the process, so that a direct collision between the occupant and the envelope surface, facing him, of the gas bag in an OOP situation is prevented.

In this embodiment, the "envelope surface" of the gas bag assigned to or facing the occupant refers to that part of the envelope of the gas bag which is provided and intended for coming into contact with the occupant striking the gas bag in the event of a crash. This envelope surface is therefore that part of the outer gas bag envelope into which the occupant is to plunge in the event of a crash. The envelope surface facing the occupant may in this case be formed in particular by a curved section of the outer envelope of the gas bag.

A gap leading, according to the present invention, into this part of the envelope of the gas bag, into which gap the occupant can penetrate in an OOP situation, is intended to prevent that envelope surface of the gas bag that is assigned to the occupant from injuring the occupant when the gas bag unfolds. Instead, that body part of the occupant which faces the envelope surface is received into the gap provided according to the present invention, as a result of which a direct collision with the outer gas bag envelope is avoided.

Preferably, provision is made for two sections of the gas bag which define the gap along longitudinal sides opposite one another to be restrained relative to one another in such a way that they close the gap after the inflation of the gas bag in order to counteract penetration of a body part of the occupant into the gap after the complete inflation of the gas bag. The two sections of the gas bag, in the inflated state, are therefore under prestress in such a way that they have the tendency to abut against one another along the gap. This is intended to achieve the effect that, in the completely inflated state, the gas bag, with its envelope surface which faces the occupant, as far as possible offers the same protection as a gas bag without a gap.

The gap preferably extends from the envelope surface assigned to the occupant in the direction of another side of the gas bag remote from the envelope surface. The extent of the gap in one direction advantageously corresponds to the extent of the gas bag in this direction, the gas bag being subdivided into two sections by the gap.

In this case, the gas bag is preferably configured in such a way that it has an open contour, in particular a contour enclosing the gap in a U-shape. In this way, the penetration of a body part of the occupant into the gap, compared with a gas bag having a completely closed contour, as described in DE 197 49 914 A1, is considerably facilitated.

According to another embodiment of the invention, the geometry of a cut fabric pattern or patterns from which the envelope of the gas bag is formed is selected in such a way that the two sections of the gas bag are restrained relative to one another on account of the geometry of the envelope of the gas bag. Thus the geometry of the envelope of the gas bag may be selected in such a way that the two sections of the gas bag, after the inflation of the gas bag, are under prestress and abut against one another if no body part of the occupant has penetrated into the gap when the gas bag is inflated.

In the process, the two sections of the gas bag are filled with gas by means of a gas generator in such a way that the two sections first of all move away from one another along the gap when the gas bag is inflated and unfolded. As a result, the gap is already wide enough at first in order to permit (in an OOP situation) the penetration of a body part of the occupant when the gas bag is inflated. If the gas bag is then essentially completely inflated, that is, if the inflowing gases no longer influence the position of the sections of the gas bag, the position of the two sections is to a considerable extent determined by the geometry of the envelope of the gas bag. By appropriate selection of the geometry of the envelope or of the geometry of the cut fabric pattern from which the envelope is made, it can then be ensured that the two sections of the gas bag abut against one another and thereby close the gap when the gas bag is inflated.

According to another embodiment of the invention, additional means are provided in order to restrain the two sections of the gas bag relative to one another, so that the two sections of the gas bag can abut against one another after the inflation of the gas bag. The additional means provided for restraining the two sections of the gas bag may be formed by a planar element which at least partly bridges the gap and restrains the two sections of the gas bag relative to one another along the gap.

According to another embodiment, the means provided for restraining the two sections of the gas bag are formed by a sheathing which surrounds the two sections of the gas bag and restrains them relative to one another and which is made of a separate cut fabric pattern (not formed by the material of the gas bag). The sheathing is preferably designed and arranged on the gas bag in such a way that it at least partly covers the gap when the gas bag is unfolded without hindrance (that is to say, in a case in which the occupant is not in an OOP situation and thus does not penetrate prematurely into the forming gap when the gas bag is inflated).

Furthermore, the sheathing is designed and arranged in such a way that, by the premature pressing forward of a body part of the occupant in the direction of the gap when the gas bag is inflated (as a consequence of an OOP situation), it can be displaced relative to the gas bag in such a way that the gap is opened to an increasing extent, so that said body part of the occupant can penetrate into the gap. In this case, a relative movement of the sheathing with respect to the gas bag means that sheathing and gas bag move relative to one another, irrespective of which of the two elements is actually moved relative to a fixed coordinate system (e.g., of the body of a motor vehicle). In particular, this also includes the case in which the sheathing is prevented from unfolding together with the gas bag by a body part of the occupant pressing forward into the gap.

To fix the position of the sheathing relative to the gas bag, the sheathing can be connected to the gas bag at at least one connecting point. In this case, provision may be made in particular for the sheathing to be connected to the gas bag in a releasable manner at part of the connecting points in such a way that these connections are released by the penetration of a body part of an occupant into the gap when the gas bag is inflated, so that the sheathing can be displaced relative to the gas bag in the manner described above in order to open the gap.

Furthermore, the sheathing preferably has at least one opening, through which a section of the gas bag can extend. This is intended to ensure the complete unfolding of the gas bag during the inflation.

An embodiment of an occupant protection device for a motor vehicle having a gas bag provided according to the present invention includes a gas bag having two sections that are moved away from one another along a gap by gases flowing into the gas bag during inflation of the gas bag.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 2b is a front view of the gas bag of FIG. 2a.

FIG. 7b is a side view of the gas bag of FIG. 7a.

DESCRIPTION

Figure 1A:
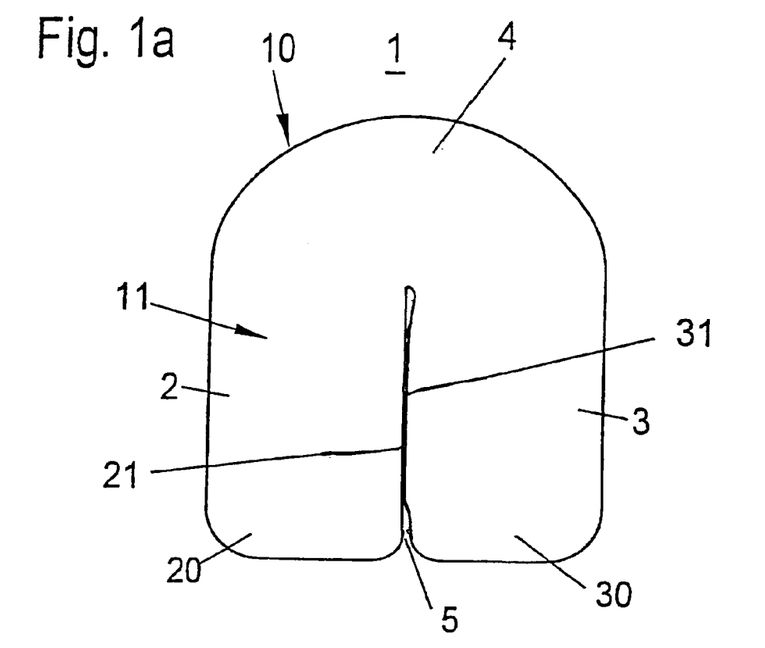
FIG. 1a is a plan view of a spread-out empty gas bag with two gas bag sections separated by a gap according to an embodiment of the present invention.

Shown in FIG. 1a is an empty gas bag which is spread out flat and comprises two gas bag sections 2, 3 (designed as legs) connected to one another via a connecting region 4 and separated from one another by a gap 5, this gas bag involving, for example, a passenger airbag. In the state shown in FIG. 1a, the shape of the gas bag is determined essentially by the geometry of the cut fabric pattern, from which the envelope 10 of the gas bag 1 is made. In this case, this cut fabric pattern is selected in such a way that the two gas bag sections 2, 3 along the gap 5 which extends from the connecting region 4 up to the free ends 20, 30 of the gas bag sections 2, 3 bear against one another with side walls 21, 31 or are only at a slight distance apart. A slight distance apart in this case means that the distance apart is always markedly smaller than the dimensions of the body parts which are to be protected by the gas bag in the event of a crash.

Figure 1B:
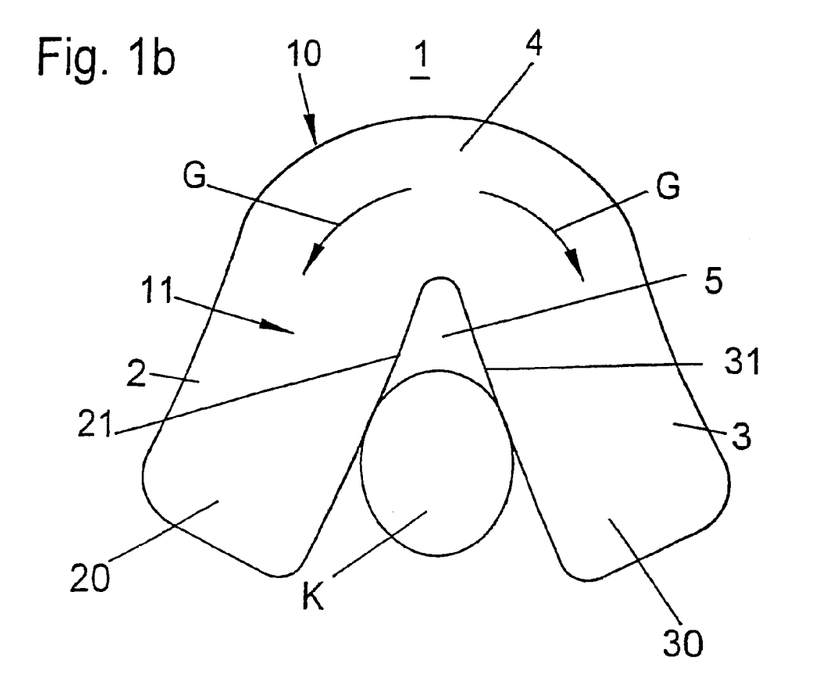
FIG. 1b is a view of the gas bag of FIG. 1a during inflation by inflowing gas.

FIG. 1b shows the gas bag 1 illustrated in FIG. 1a in a state in which it is filled with gas. To this end, a suitable gas generator is arranged in such a way that the gases G flowing into the gas bag 1 have the tendency to move the two sections 2, 3 of the gas bag 1 away from one another, so that the continuous gap 5 (defined by the side walls 21, 31 of the sections 2, 3) between the two sections 2, 3 of the gas bag 1 expands. In other words, the gases G flow out of the gas generator into the two sections 2, 3 of the gas bag 1 in such a direction that the free ends 20, 30 of said sections 2, 3 are moved in opposite directions, in the course of which they move away from one another and the sections 2, 3 of the gas bag 1 no longer bear against one another. As a result, the gap 5 between the two leg-like sections 2, 3 of the gas bag becomes larger, and the occupant of a motor vehicle can penetrate into said gap 5 in an OOP situation.

In Fig. 1b, the head K of an occupant is shown schematically between the two sections 2, 3 of the gas bag 1. Such penetration of the head K of an occupant between the two sections 2, 3 of the gas bag 1 occurs, for example, if the occupant, at the instant at which the gas bag is triggered on account of a vehicle deceleration, is located very close to the gas bag 1 with his head outside his normal seating position. In this case, the vehicle occupant, with his head K (and possibly also with further body parts, such as his chest, for example), penetrates into the gap 5 between the two sections 2, 3, which forms when the gas bag 1 is inflated. As a result, the gap 5 is widened even further, so that the entire head of the occupant can be received. This avoids an unavoidable collision between the head K of the occupant and the envelope surface 11, facing him, of the envelope 10 of the gas bag 1, so that the risk of injury to the occupant caused by the unfolding gas bag 1 in an OOP situation is considerably reduced.

On the other hand, if the occupant is located in a normal seating position when the airbag module is triggered and the gas bag 1 is subsequently inflated, the gas bag 1 can unfold undisturbed, that is to say, without contact with the occupant. In this case, too, a gap 5 is first of all formed between the two sections 2, 3 by the direction of the gases G flowing into the sections 2, 3 of the gas bag 1. However, if the inflation of the gas bag 1 has been completed and accordingly gases no longer flow into the sections 2, 3 of the gas bag 1, the two sections 2, 3, on account of the geometry, shown in FIG. 1a, of the cut gas bag pattern, from which the envelope 10 of the gas bag 1 is made, then have the tendency to move toward one another with their side walls 21, 31, as a result of which the gap 5 is closed or at least considerably reduced. This ensures that the envelope surface 11, facing the occupant, of the envelope 10 of the gas bag 1, in such cases in which the occupant is located in a normal seating position when the gas bag 1 is inflated, offers the same protection as a conventional gas bag without a gap. In this case, additional catch bands, for example, may be provided in order to also restrain the two gas bag sections 2, 3 relative to one another on that side of the gap 5 which is remote from the cloth or net 6.

Figure 2A:
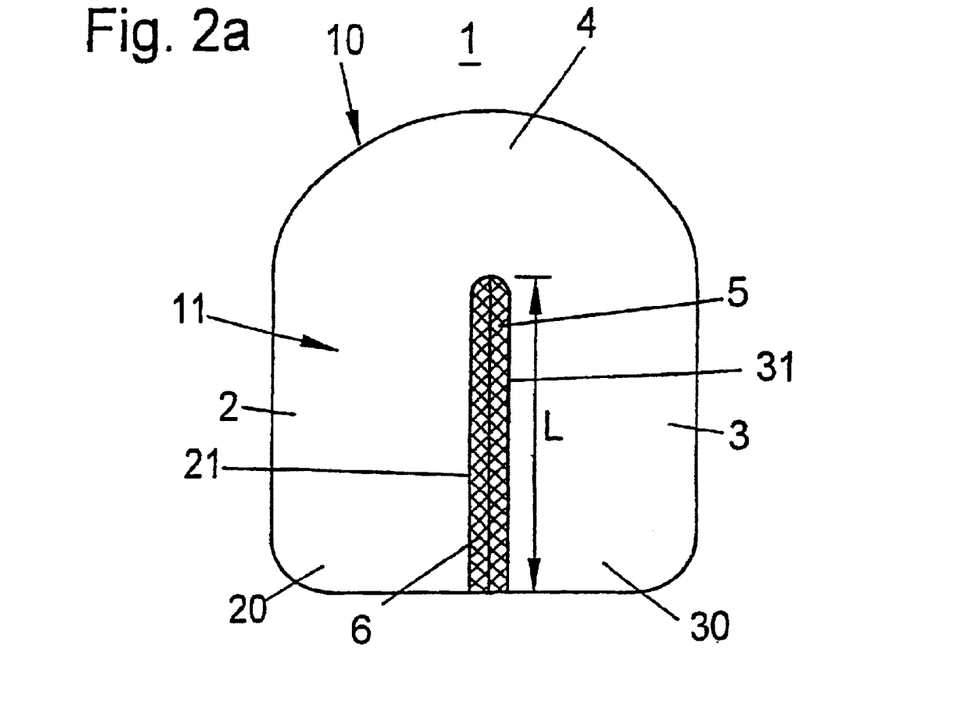
FIG. 2a is a plan view of a gas bag with two gas bag sections in the inflated state, the gap between the two gas bag sections being bridged by a planar element according to an embodiment of the present invention.

FIG. 2a shows a modification of the gas bag from FIG. 1b in the inflated state. In the exemplary embodiment according to FIG. 2a, the gas bag 1 also consists of two sections 2, 3 connected to one another via a connecting region 4, the envelope 10 of the gas bag 1 having an envelope surface 11 facing the occupant. A gap 5 runs between the two sections 2, 3 of the gas bag 1. The two longitudinal sides of this gap 5 are defined by side walls 21, 31 of the sections 2 and 3, respectively, of the gas bag 1.

Figure 2B:
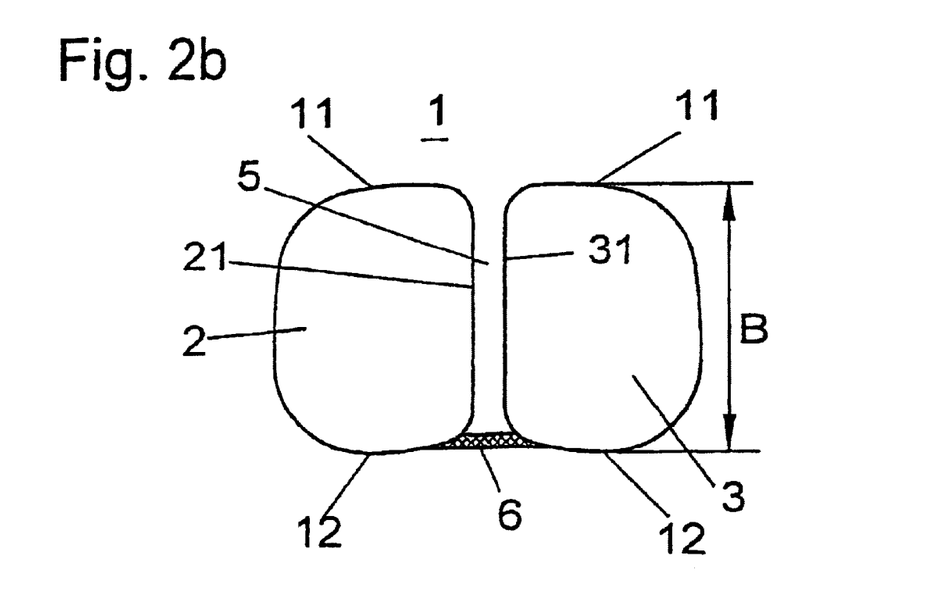

As can be seen with reference to the front view from FIG. 2b, the gap 5 extends along the entire width B of the gas bag 1 from the envelope surface 11 up to the opposite side 12 of the gas bag envelope 10. On this side 12, remote from the envelope surface 11, of the gas bag envelope 10, the two sections 2, 3 are connected to one another by means of a planar element 6, e.g., a cloth, a net, or the like, which bridges the gap 5. As a result, the two sections 2, 3 of the gas bag 1 are restrained relative to one another, so that they have the tendency to abut against one another along the gap 5 and close the latter. This is intended to ensure that the envelope surface 11, which faces the occupant and into which the gap 5 leads, forms as continuous an impact surface as possible for a motor vehicle occupant located in the normal position.

Figure 3A:
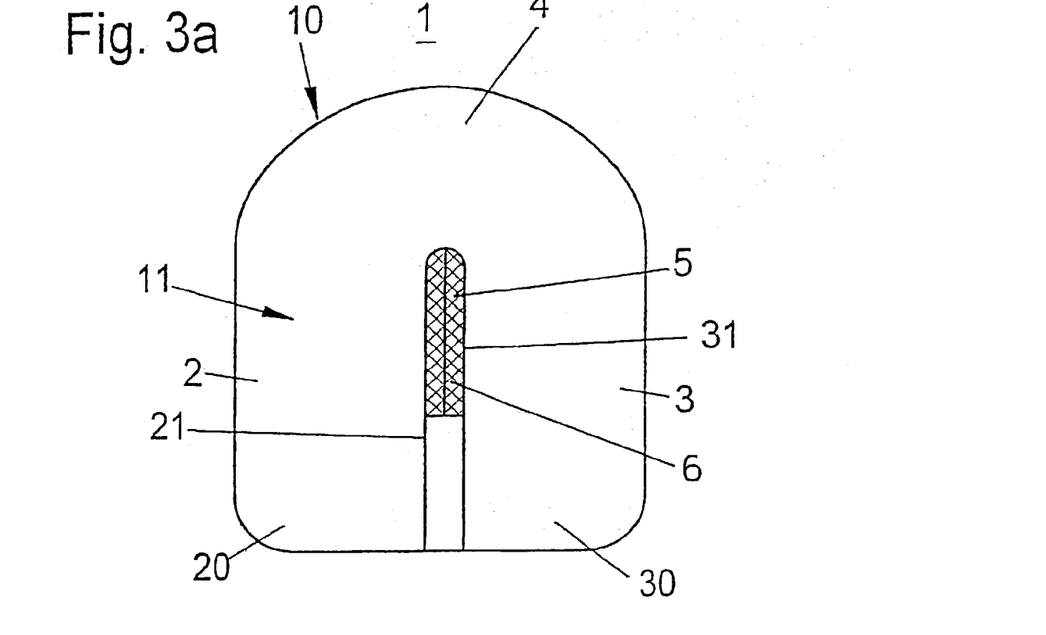
FIG. 3a is a plan view of a gas bag with the planar element extending only along part of the gap between the two gas bag sections according to another embodiment of the present invention.

In this case, the cloth or net 6 may extend either over the entire length L (extent transversely to the width B of the gas bag 1) of the gap 5, cf. FIG. 2a, or, according to a variant shown in FIG. 3a, only over part of the length L of the gap 5, so that especially pronounced widening of the gap 5 is made possible in a front part of the gap 5, in which the latter leads into the envelope 10 of the gas bag 1.

Transversely to its main extension direction, which runs from the envelope surface 11 facing the occupant to the opposite side 12 of the gas bag envelope 10, the gap 5 is defined on one side by the connecting region 4 of the two sections 2, 3, whereas it leads on the opposite side into the envelope 10 of the gas bag.

Figure 2C:
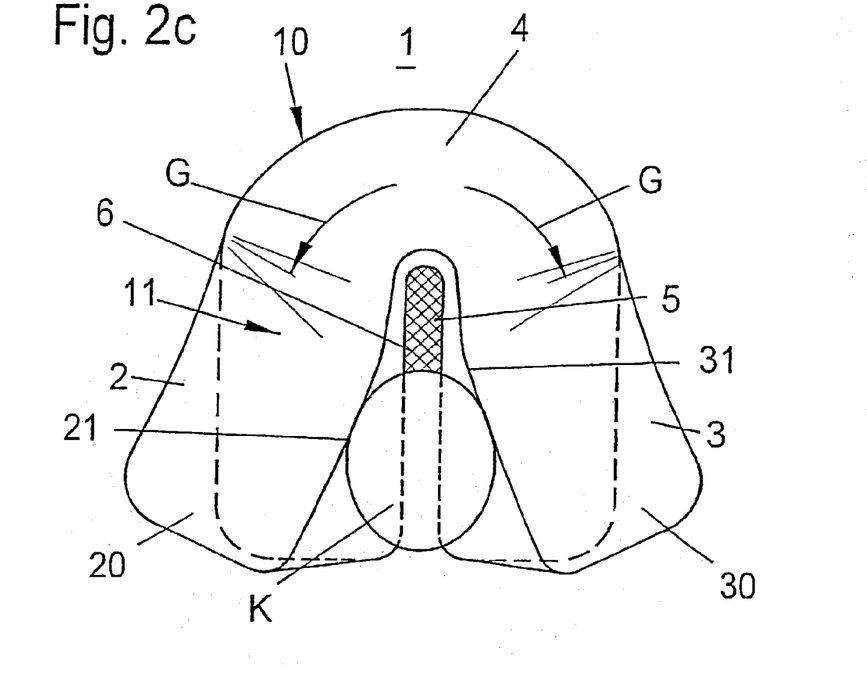
FIG. 2c is a view of the gas bag of FIGS. 2a and 2b during inflation with a body part of an occupant penetrating into the gap between the two gas bag sections.
Figure 2D:
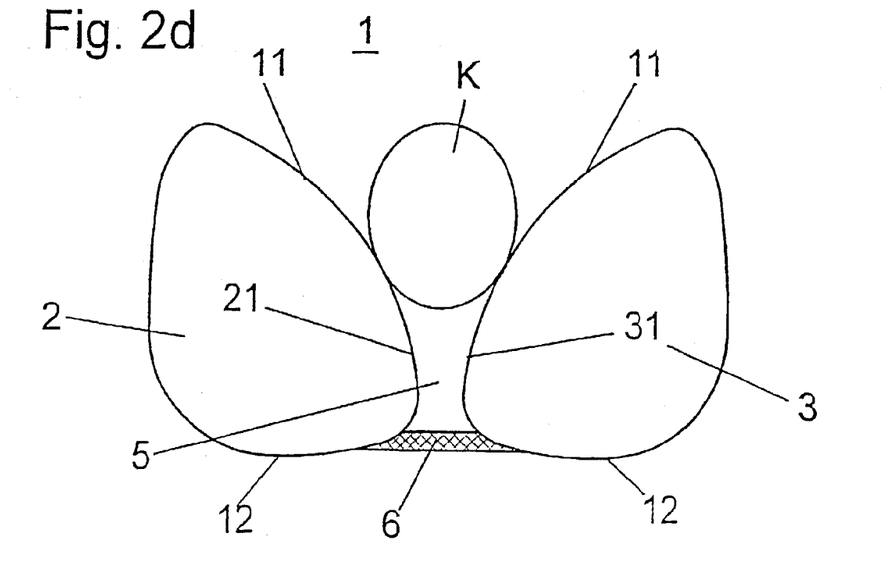
FIG. 2d is a front view of the gas bag of FIGS. 2a and 2b during inflation with a body part of an occupant penetrating into the gap between the two gas bag sections.

FIGS. 2c and 2d show the gas bag from FIGS. 2a and 2b in a case in which a vehicle occupant is located outside his normal position, namely very close to the airbag module, at the instant of a considerable vehicle deceleration and thus at the instant the airbag module containing the gas bag 1 is triggered. In this case, when the gas bag is inflated, the vehicle occupant, with his body part facing the envelope surface 11, i.e., his head K, penetrates into the gap 5 between the two sections 2, 3 of the gas bag 1, as a result of which said sections 2, 3 are opened out. In this way, a direct collision between the vehicle occupant, in particular his head K, and the envelope surface 11 facing him is avoided when the gas bag 1 unfolds, and thus the risk of injury to the occupant caused by the unfolding gas bag is considerably reduced.

Figure 3B:
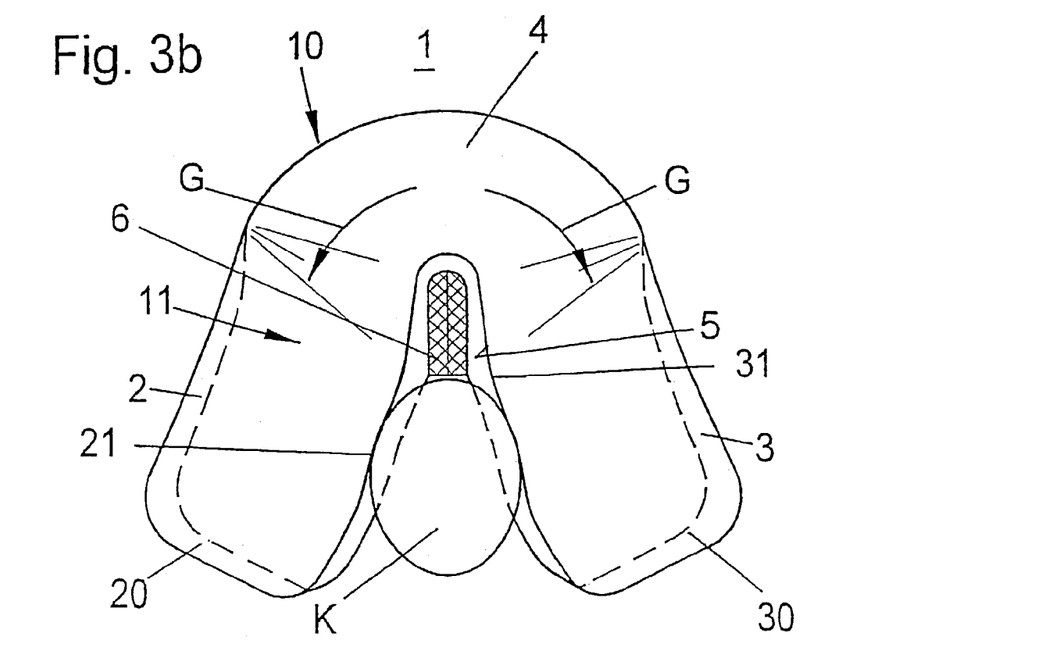
FIG. 3b is a view of the gas bag of FIG. 3a during the inflation with a body part of an occupant penetrating into the gap between the two gas bag sections.

In FIG. 3b, the penetration of the head K of a vehicle occupant into the gap between the two sections 2, 3 of the gas bag 1 is shown in the case in which the planar element 6 extends only over part of the length L of the gap 5, a factor which facilitates the widening of the gap 5 by the entering head K.

Figure 4:
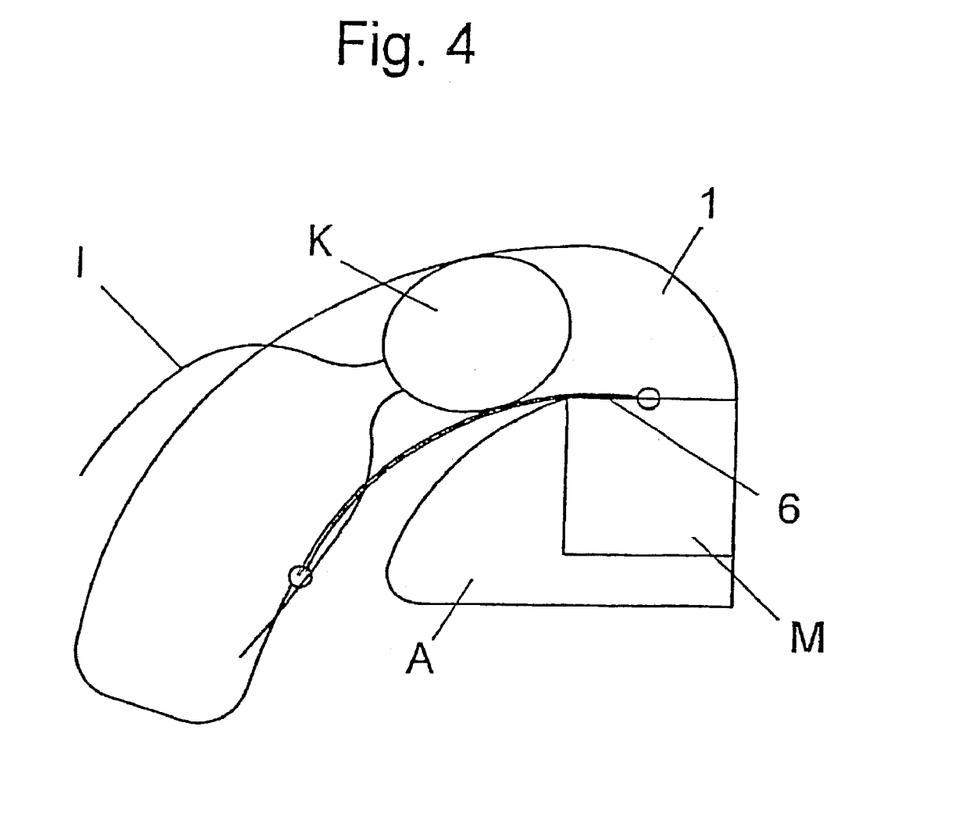
FIG. 4 is a side view of an occupant who has penetrated into a gap between two gas bag sections of the gas bag of FIGS. 2a–2d.

FIG. 4 schematically shows an occupant I of a motor vehicle, in particular a front-seat passenger, who is located very close to the gas bag 1 when the gas bag 1 is inflated according to FIGS. 2a to 2d. As a result, the occupant I, with his head K and his chest region, penetrates into the gap 5 between the two sections 2, 3 of the gas bag 1, which unfolds from an airbag module M in the dashboard A of a motor vehicle.

Figure 5A:
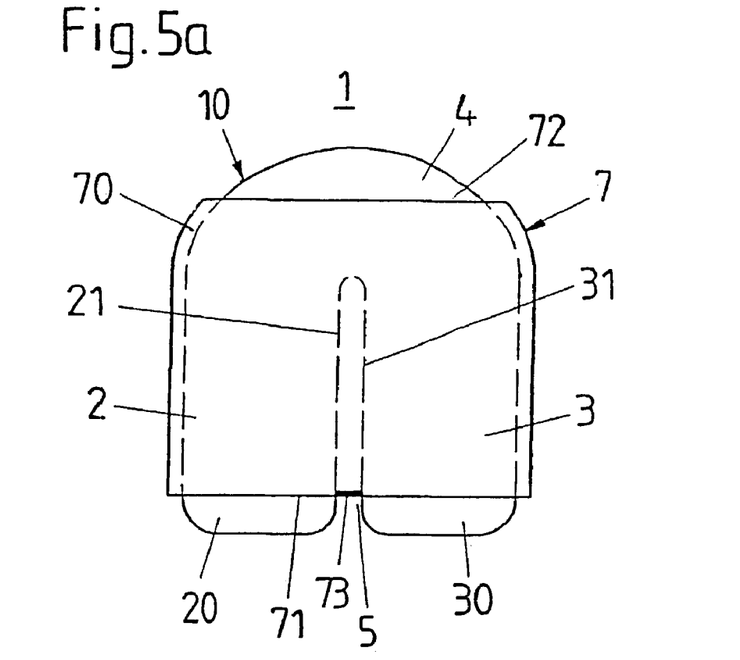
FIG. 5a is a plan view of a gas bag in which the two gas bag sections are enclosed by a sheathing and are restrained relative to one another by means of the sheathing according to yet another embodiment of the present invention.

FIG. 5a shows a gas bag 1 designed according to the invention in the inflated state, the envelope 10 of this gas bag 1 being of identical design to the gas bag envelope from the preceding exemplary embodiments. In particular, the gas bag envelope 10, in the plan view according to FIG. 5a, has an open, essentially U-shaped contour. As a result, the gas bag forms two sections 2, 3 which are separated from one another by the gap 5 and have free ends 20, 30 and a connecting region 4 between the two sections 2, 3.

In order to restrain the two gas bag sections relative to one another, the gas bag 1 is surrounded by an additional sheathing 7 which encloses the two sections 2, 3 of the gas bag 1 and presses them against one another in the region of the gap 5 with their side walls 21, 31 which define the gap. The sheathing 7 formed from a cut material pattern 70 is designed to be open at its front and rear ends 71 and 72, respectively, so that the two gas bag sections 2, 3, with their ends 20, 30 and the connecting region 4, project in each case from the sheathing 7.

Furthermore, the sheathing 7 has a gusset 73 in the region of the gap 5, so that two separate openings for the front ends 20, 30 of the two gas bag sections 2, 3 are formed at the open front side 71 of the sheathing.

For the defined positioning of the sheathing 7 relative to the gas bag 1, this sheathing 7 may be fixed, for example, in the region of the front ends 20, 30 of the gas bag 1 and at the connecting region 4 of the gas bag (e.g., by adhesive bonding or sewing), the connecting points between the sheathing 7 and the free ends 20, 30 of the gas bag sections 2, 3 being designed to be releasable.

FIG. 5a shows a plan view of the gas bag 1 with sheathing 7, this plan view representing both the empty gas bag spread out flat (i.e., in a state before the gas bag is folded together or gathered up together with the sheathing to form a pack which can be stowed in a housing) and the gas bag 1 inflated (unfolded) without hindrance.

When the gas bag is inflated without hindrance (i.e., there is no premature collision with a bent-forward vehicle occupant in an OOP situation when the gas bag is unfolded), the two gas bag sections 2, 3 are restrained relative to one another by the sheathing 7 in such a way that the gap 5 between the two gas bag sections 2, 3 is largely closed. That is to say that the two inner side walls 21, 31 of the gas bag sections 2, 3 are pressed against one another by the effect of the sheathing 7. At the same time, the sheathing 7 covers the gap 5.

Figure 5B:
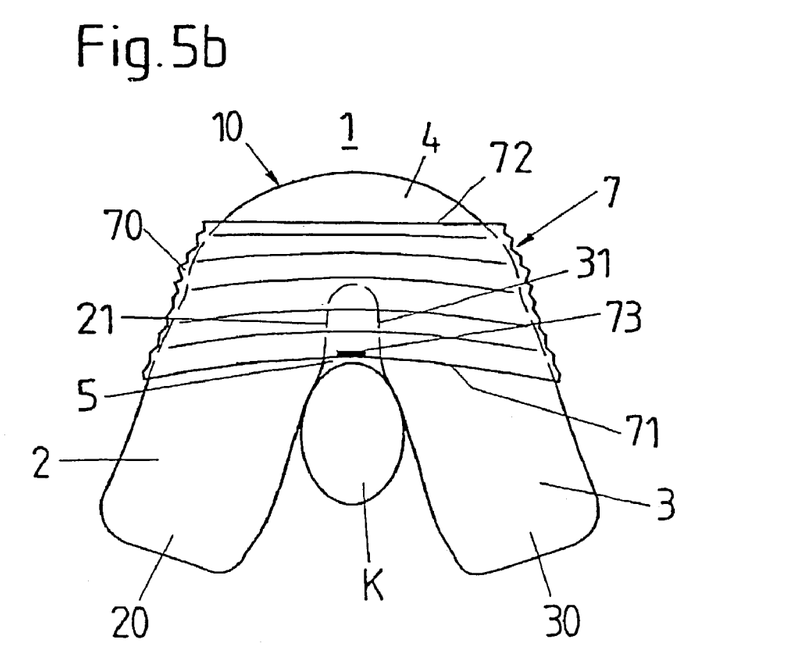
FIG. 5b is a view of the gas bag of FIG. 5a during the inflation with a body part of an occupant penetrating into the gap between the two gas bag sections.

On the other hand, if an occupant is in an OOP situation when the gas bag 1 is inflated, so that, with a body part, e.g., his head K, he is already pressing forward into the gap 5 of the gas bag 1 when the latter is unfolded, the connecting points between the sheathing 7 and the free ends 20, 30 of the gas bag sections 2, 3 are thereby released. This is a consequence of the forces which act when the head K plunges into the gap 5 of the gas bag 1.

Furthermore, by the plunging of the head K into the gap 5, the sheathing 7, when the gas bag 1 is being unfolded, is increasingly displaced rearward relative to the ends 20, 30 of the gas bag sections 2, 3 or is prevented from unfolding together with the gas bag 1, so that the head K can plunge increasingly further into the gap 5. At the same time, the two gas bag sections 2, 3 are pushed away outward. By this plunging of the head K of an occupant into the gap 5, the risk of injury in an OOP case is considerably reduced.

Figure 6A:
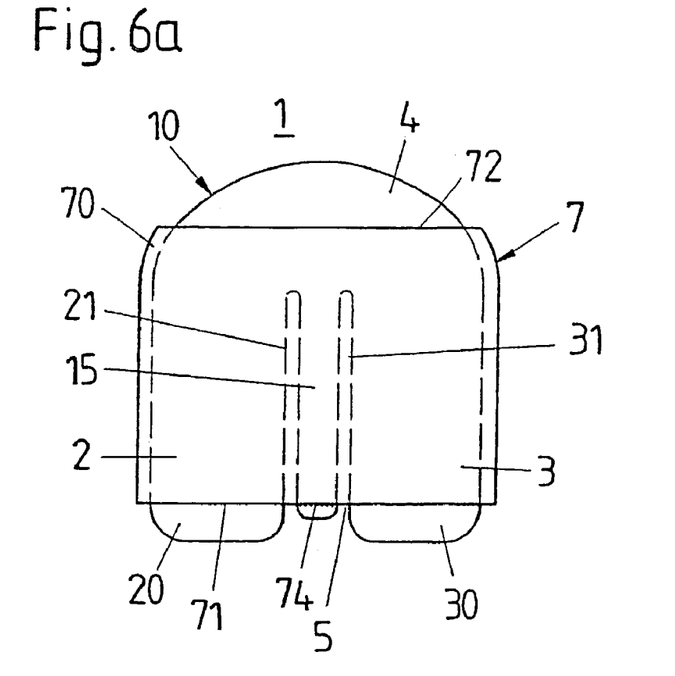
FIG. 6a is a plan view of a gas bag having an additional gas bag section inside the gap as a positioning aid for the sheathing according to still another embodiment of the present invention.

A modification of the gas bag shown in FIG. 5a is shown in FIG. 6a, in which an additional gas bag section (positioning section 74) extends in the region of the gap 5 as a positioning aid for the front end 71 of the sheathing 7.

The front end 71 of the sheathing 7 is connected to the positioning section 74. When the gas bag 1 is inflated, the front end 71 of the sheathing 7 is thereby positioned in the region of the free ends 20, 30 of the gas bag sections 2, 3. In addition, the sheathing 7 is preferably connected in the region of its rear end 72 to the connecting region 4 of the gas bag 1.

The representation according to FIG. 6a therefore not only represents the gas bag 1 with sheathing 7 in the empty state spread out flat but also at the same time represents the state in which the gas bag 1 has been inflated without hindrance. This is because, by the fixing of the sheathing 7 with its front end 71 in the region of the ends 20, 30 of the gas bag sections 2, 3 at the positioning section 74 and also in the region of its rear end 72 on the connecting region 4 of the gas bag 1, the sheathing 7, when the gas bag 1 is inflated, maintains its position which is fixed by means of said connecting points and in which it encloses the two sections 2, 3.

In the inflated state of the gas bag 1, the two gas bag sections 2, 3 are restrained relative to one another by means of the sheathing 7, and as a result, the gap 5 is essentially closed, so that the gas bag offers the same protective function as a gas bag without a gap.

Figure 6B:
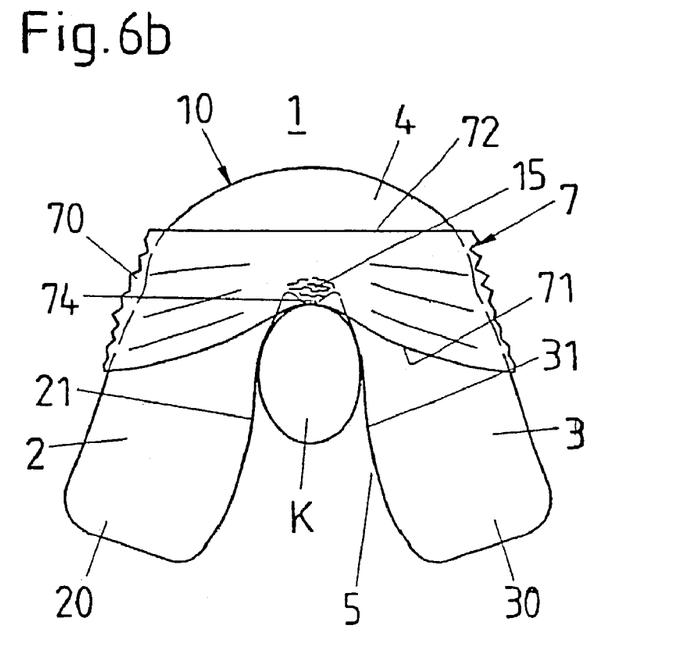
FIG. 6b is a view of the gas bag of FIG. 6a during the inflation with a body part of an occupant penetrating into the gap between the two gas bag sections.

On the other hand, if an occupant is in an OOP situation and is bent forward in the direction of the gas bag when the gas bag 1 is inflated, he can press forward with his head K into the gap 5 of the gas bag 1 when the latter is unfolded. As a result, he blocks the unfolding and inflation of the positioning section 74 of the gas bag 1. The gas therefore flows solely into the two lateral gas bag sections 2, 3.

Owing to the fact that the positioning section 74 extending into the gaps 5 is not inflated, the sheathing 7, when the head K plunges into the gap 5, can be displaced increasingly rearward in the direction of the connecting region 4 or can be prevented from unfolding together with the gas bag 1. At the same time, the two gas bag sections 2, 3 are pushed away laterally outward. This in turn permits further plunging of the head K into the gap 5 with corresponding reduction in the risk of injury in an OOP case.

Figure 7A:
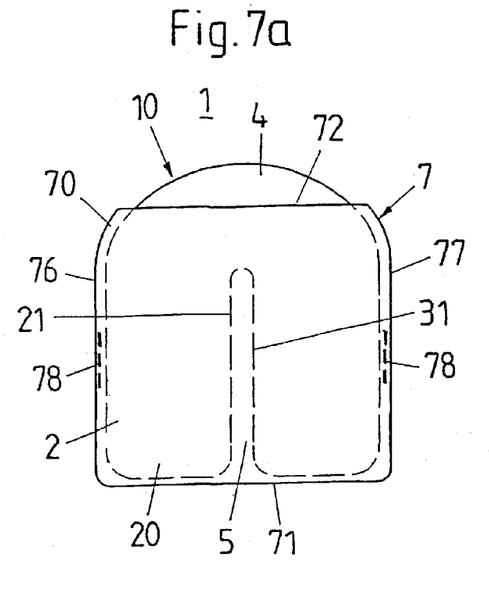
FIG. 7a is a plan view of a gas bag in which the sheathing of the gas bag has lateral openings through which the two gas bag sections can extend in an OOP situation according to another embodiment of the present invention.
Figure 7B:
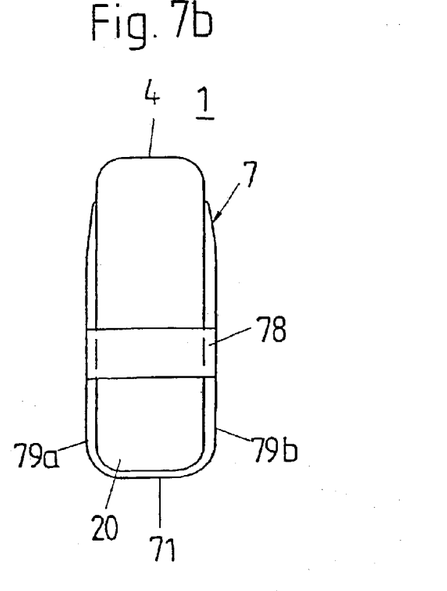

FIGS. 7a and 7b show a further modification of the exemplary embodiment according to FIG. 5a. Here, the sheathing 7 of the gas bag 1 is closed at its front end 71, so that the gas bag sections 2, 3, with their free ends 20, 30, cannot pass through the front end 71 of the sheathing 7. Instead, the sheathing 7, according to FIGS. 7a and 7b, has openings in its side walls 76, 77, through which openings the gas bag sections 2, 3 can extend outward, cf. FIG. 7c. This is because, at the sheathing 7, according to FIG. 7b, a bottom and a top material section 79a and 79b, respectively, are connected laterally only via a comparatively narrow web 78. As a result, said openings are formed in the side walls 76, 77 of the sheathing 7, through which openings the gas bag 1, with its sections 2, 3, can extend.

As in the preceding exemplary embodiments, FIG. 7a represents both the empty gas bag spread out flat and the gas bag 1 inflated without hindrance. On the other hand, the corresponding side view according to FIG. 7b shows the gas bag 1 only in its completely inflated state, in which it is accommodated between a bottom section 79a and a top section 79b of the sheathing 7.

Since the sheathing 7 (taking into account the lateral connecting webs 78) encloses the gas bag 1 or in particular its sections 2, 3 in a ring shape, restraining of the two gas bag sections 2, 3 relative to one another is also achieved here.

Figure 7C:
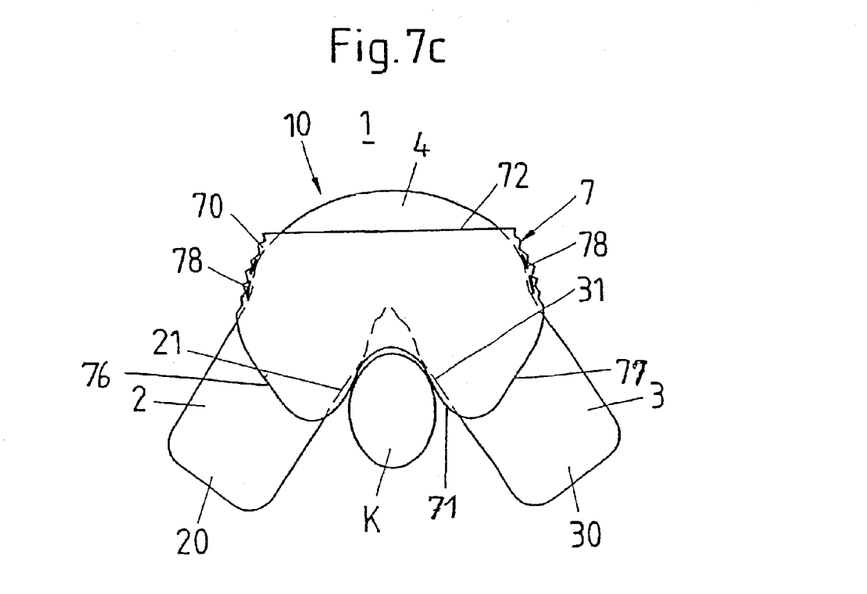
FIG. 7c is a plan view of the gas bag of FIGS. 7a and 7b during the inflation with a body part of an occupant penetrating into the gap between the two gas bag sections.

However, if an occupant is in a state bent forward to a considerable degree in the direction of the gas bag 1 when the gas bag 1 is inflated, he presses forward in the direction of the gap 5 of the gas bag 1 when the latter is unfolded, the two gas bag sections 2, 3 being pushed away outward. They can then pass through the openings in the side walls 76, 77 of the sheathing 7. As a result, the head K of the occupant can press increasingly forward into the gap 5, the sheathing 7 being displaced rearward in the direction of the connecting region 4 of the gas bag 1 or being prevented from unfolding. This in turn permits deep plunging of the head K into the gap 5, so that a hard collision between the head K of an occupant and the gas bag 1 is prevented in an OOP situation.

The configuration provided according to the invention of a gas bag is suitable in particular for driver and passenger airbag modules; however, it may also be used in side airbags or other airbags.

The priority document, DE 100 33 937.9, filed on Jul. 5, 2000, and published as DE 100 33 937 on Jan. 24, 2002 is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An inflatable gas bag for protecting an occupant of a motor vehicle comprising:
   a fabric having a U-shape when the bag is uninflated and having a surface configured to face the occupant to be protected;
   a gap that leads into the surface;
   wherein the gap is defined along longitudinal sides by first and second sections of the gas bag, and wherein the first section and the second section are opposite one another;
   wherein the gas bag is configured so that a body part of the vehicle occupant outside a normal seating position can penetrate the gap as the gas bag inflates thereby expanding the gap; and
   wherein the gas bag is configured so that when the gas bag initially inflates, the first and second sections are separated by the gap, and when the gas bag further inflates, the first and second sections of the gas bag are restrained relative to one another so that the first section and the second section close the gap after inflation of the gas bag and the first and second sections abut against one another.

2. The gas bag of claim 1, wherein the gap extends from the surface in a direction of another side of the gas bag remote from the surface.

3. The gas bag of claim 2, wherein the length of the gap in one direction is essentially the same as the length of the gas bag in that direction.

4. The gas bag of claim 1, wherein the distance that the gap leads into the surface is limited by a connecting region of the first and second sections of the gas bag.

5. The gas bag of claim 1, wherein the gas bag is subdivided into at least two sections by the gap.

6. The gas bag of 1, wherein the gas bag has an open contour.

7. The gas bag of claim 6, wherein the gas bag is configured so that the first and second sections of the gas bag, after inflation of the gas bag, are under prestress and have a tendency to abut against one another if no body part of the vehicle occupant has penetrated into the gap when the gas bag is inflated.

8. The gas bag of claim 1, further comprising a mechanism to restrain the first and second sections of the gas bag relative to one another.

9. The gas bag of claim 8, wherein the mechanism causes the first and second sections of the gas bag to have a tendency to abut against one another along the gap if no body part of a vehicle occupant has penetrated into the gap when the gas bag is inflated.

10. The gas bag of claim 8, wherein the mechanism includes a planar element that bridges the gap and restrains the first and second sections of the gas bag relative to one another along the gap.

11. The gas bag of claim 10, wherein the planar element bridges only a section of the gap.

12. The gas bag of claim 8, wherein the mechanism includes a sheathing that surrounds the first and second sections of the gas bag.

13. The gas bag of claim 12, wherein the sheathing is positioned so that after unfolding of the gas bag without hindrance the sheathing partly covers the gap.

14. The gas bag of claim 12, wherein the sheathing is configured to be displaced, by penetration of a body part of the vehicle occupant into the gap during inflation of the gas bag so that the gap is opened to an increasing extent.

15. The gas bag of claim 12, wherein the sheathing is connected to the gas bag at at least one connecting point.

16. The gas bag of claim 15, wherein the sheathing is releasably connected to the gas bag at at least one connecting point so that the connection can be released by penetration of a body part of the vehicle occupant into the gap during inflation of the gas bag.

17. The gas bag of claim 12, wherein the sheathing includes at least one opening through which the first and second sections of the gas bag can extend.

18. The gas bag of claim 1, wherein the first and second sections of the gas bag are configured to be moved away from one another along the gap by gases flowing into the gas bag during inflation of the gas bag.

19. An inflatable gas bag for protecting an occupant of a motor vehicle comprising:

a surface configured to face the occupant to be protected;
a gap that leads into the surface;
wherein the gap is defined along longitudinal sides by first and second sections of the gas bag, and wherein the first section and the second section are opposite one another,
wherein the gas bag is configured so that a body part of the vehicle occupant outside a normal seating position can penetrate the gap as the gas bag inflates thereby expanding the gap, wherein the first and second sections of the gas bag are restrained relative to one another so that the first section and the second section close the gap after inflation of the gas bag, and wherein the first and second sections are restrained relative to one another by a cut pattern from which the gas bag is made.

* * * * *